United States Patent
Yamakaji

[11] Patent Number: 5,917,119
[45] Date of Patent: Jun. 29, 1999

[54] METHOD FOR DECIDING PARAMETERS FOR DYEING LENSES AND METHOD FOR PRODUCING COLORED LENSES

[75] Inventor: Tetsuma Yamakaji, Tokyo, Japan

[73] Assignee: Hoya Corporation, Tokyo, Japan

[21] Appl. No.: 08/860,020

[22] PCT Filed: Dec. 20, 1995

[86] PCT No.: PCT/JP95/02613

§ 371 Date: Jul. 3, 1997

§ 102(e) Date: Jul. 3, 1997

[87] PCT Pub. No.: WO96/19740

PCT Pub. Date: Jun. 27, 1996

[30] Foreign Application Priority Data

Dec. 22, 1994 [JP] Japan .................................. 6-319808

[51] Int. Cl.$^6$ ................................ D06P 5/00; G01J 3/46; G02B 13/00
[52] U.S. Cl. ....................... 8/400; 8/506; 8/638; 364/526
[58] Field of Search ................................ 8/400, 506, 638; 364/526

[56] References Cited

U.S. PATENT DOCUMENTS 5,335,187  8/1994  Koizumi et al. .
5,402,362  3/1995  Prosser ..................................... 364/526

FOREIGN PATENT DOCUMENTS

A 4-226420  8/1992  Japan .

OTHER PUBLICATIONS

E. Allen, "Basic Equations Used in Computer Color Matching," J. Opt. Soc. Am., vol. 56, #9, pp. 1256–1259 Sep. 1996.

E. Allen, "Basic Equations Used in Computer Color Matching II, Tristimulus Match, Two–Constant Theory," J. Opt. Society Am., vol. 64, #7 pp. 991–993 Jul. 1974.

Parks et al, "Spectrophotometric Formulation," J. Opt. Soc. Am., vol. 34, #2 pp. 112–113, Feb. 1944.

*Primary Examiner*—Margaret Einsmann
*Attorney, Agent, or Firm*—Griffin, Butler, Whisenhunt & Szipl, LLP

[57] ABSTRACT

Disclosed are a method for deciding dyeing parameters for dyeing lenses in a dye bath consisting of mixed system of three colors, the parameters including dye concentrations and dyeing time, which method comprises deciding the dyeing parameters based on relation of minute color difference of colored lenses represented in a uniform color space coordinate system with minute difference of dye concentration for each color and minute difference of immersion time in the dye bath and a method for producing colored lenses wherein lenses are dyed by using dyeing parameters obtained by said method. The method of the present invention enables easier and more accurate decision of dye concentrations of dye bath and dyeing time for dyeing lenses, in particular, plastic lenses, which are used for obtaining lenses in a target color.

36 Claims, 1 Drawing Sheet

System

METHOD FOR DECIDING PARAMETERS FOR DYEING LENSES AND METHOD FOR PRODUCING COLORED LENSES

TECHNICAL FIELD

The present invention relates to methods for deciding parameters for dyeing lenses and for producing colored lenses. In particular, the present invention relates to a method for deciding dye concentrations of dye bath (one bath) for dyeing lenses consisting of a mixed system of three colors suitable for desired dyeing and immersion time therein based on relation of a desired color of colored lens represented in a uniform color space coordinate system, for example, (L*, a*, b*) to dye concentrations for the colors and immersion time in the dye bath.

BACKGROUND ART

Plastic lenses can be easily dyed with good quality and therefore they are dyed in various kinds of colors as customers desired. However, while such dyeing is usually performed at stores or factories, the actual situation is that determination of the dyeing conditions including kinds and concentrations of dyes, temperature of dye bath, immersion time in the dye bath and the like greatly relies on sense and experience of dyeing engineers.

For example, there has been known a color blending method using parameters generally referred to as dyers variables and known to artisans of dyeing and color toning. In this method, dyeing prescription is formulated by adjusting formulation ratio of dyes through comparison of concentrations of target color and sample color based on the knowledge of dyeing engineers that difference of color concentration corresponds to differences of dye concentrations and, when concentration of the sample color is adjusted to that of the target color, remaining color difference may be due to difference of formulation ratio of the dyes.

However, the above method has drawbacks that considerable skill is required to adjust the concentration of the sample color to that of the target color and that it is difficult to ultimately point to the target color because, when dye composition is changed to adjust the hue after the concentration is adjusted, the concentration may be changed again. Further, this method is mainly used for dying in the textile industry, painting using pigments in the coating industry and the like, but it is not suitable for dyeing of lenses where dyed color concentration changes depending on the immersion time in dye bath.

In the fields of dyeing textiles, painting, printing and the like, various kinds of techniques such as CCM (computer color matching) have also been known. The CCM method utilizes color correction equations represented by the following equations 1:

$$\left(\frac{\partial X}{\partial C_1}\right)\Delta C_1 + \left(\frac{\partial X}{\partial C_2}\right)\Delta C_2 + \left(\frac{\partial X}{\partial C_3}\right)\Delta C_3 = \Delta X \quad (1)$$

$$\left(\frac{\partial Y}{\partial C_1}\right)\Delta C_1 + \left(\frac{\partial Y}{\partial C_2}\right)\Delta C_2 + \left(\frac{\partial Y}{\partial C_3}\right)\Delta C_3 = \Delta Y$$

$$\left(\frac{\partial Z}{\partial C_1}\right)\Delta C_1 + \left(\frac{\partial Z}{\partial C_2}\right)\Delta C_2 + \left(\frac{\partial Z}{\partial C_3}\right)\Delta C_3 = \Delta Z$$

In the equations, X, Y and Z are three stimulus values of color, $C_1$, $C_2$ and $C_3$ are dye concentrations for dye formulation of the target color, $\Delta X$, $\Delta Y$ and $\Delta Z$ are differences between a sample color and the target color in the X, Y, Z coordinates and $\Delta C_1$, $\Delta C_2$ and $\Delta C_3$ are necessary corrections for the dye concentrations.

The nine coefficients of from $(\partial X/\partial C_1)$ to $(\partial Z/\partial C_3)$ are correction factors representing variations of three stimulus values corresponding to changes of the dye concentrations.

The color correction equations represented by the above equations 1 are used for the final fine adjustment of dye formulation in most cases utilizing the CCM method. The color correction equations mentioned above have widely been used for dyeing in the textile industry, for painting using pigments and in the printing industry and the like. In these fields, since all of dyes or pigments are adsorbed or kneaded with dyeing objects, changes of colors and concentration with dyeing time are not considered at all. In addition, since all of the dyes are adsorbed on fibers or the like upon dyeing, interactions of dyes can be ignored and rough matching can function successfully. Therefore, the CCM method is used for the color correction only as an assistant means.

On the other hand, the conventional color correction equations, which do not take dyeing time into consideration, cannot be applied as it is to applications where dyeing concentration and hue may change with variation of dyeing time while dye concentrations are constant like in the field of lens dyeing.

As a method for color matching in dyeing lenses which does not require sense or experience of dyeing engineers, Japanese Patent Unexamined Publication No. Hei 4-226420 discloses a method for deciding dye concentrations of dye bath and dyeing time where the dyeing parameters are decided based on numerically represented spectroscopic characteristics of colored lenses.

However, this method has a drawback that dyeing rate and decolorization rate should be preliminarily determined for each dye. Further, this method is designed for rough matching where dyeing is performed based on the spectroscopic characteristics of colored lenses, but such rough matching is unsuitable for fine adjustment of color. Moreover, for usual colors, this method uses additional dyeing for color correction after dyeing in a dye bath of color close to the target color. This color correction is delicate operation and it is actually quite difficult.

Therefore, an object of the present invention is to provide a method which enables easier and more accurate decision of dye concentrations of dye bath and dyeing time for dyeing lenses, in particular, plastic lenses, in a target color.

Another object of the present invention is to provide a method for producing colored lenses, which utilizes the above method.

SUMMARY OF THE INVENTION

The present invention provide a method for deciding dyeing parameters for dyeing lenses in a dye bath composed of mixed system of three colors, the parameters including dye concentrations and dyeing time, which method comprises deciding the dyeing parameters based on relation of minute color difference of colored lenses represented in a uniform color space coordinate system with minute difference of dye concentration for each color and minute difference of immersion time in the dye bath.

BEST MODE FOR CARRYING OUT THE INVENTION

Figure 1:
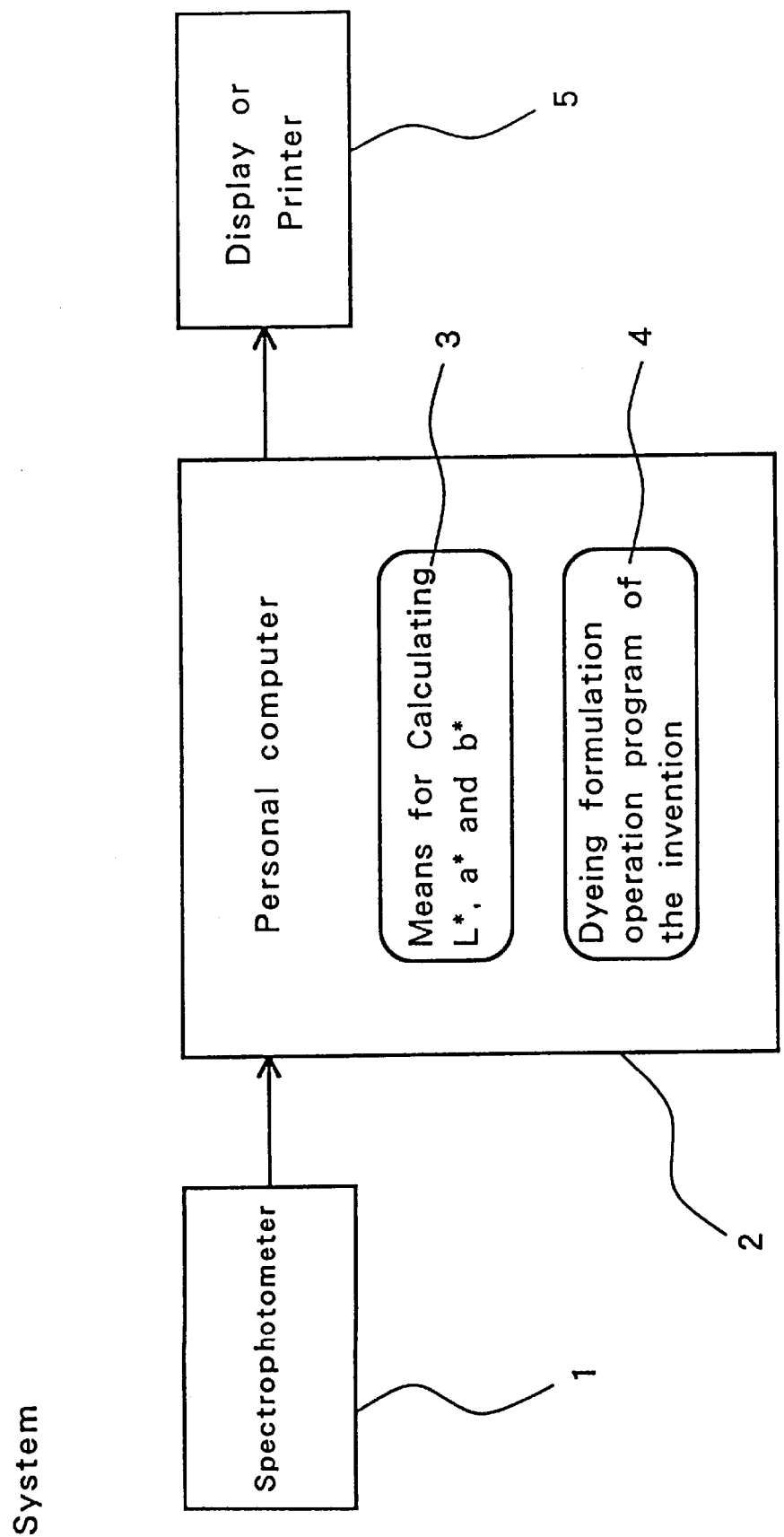
FIG. 1 is a schematic block diagram of the dye formulation operation system using a personal computer.

In the method of the present invention, relation of minute color difference of colored lenses in a uniform color space coordinate system with minute difference of dye concentration for each color and minute difference of dyeing time can be obtained by solving color correction simultaneous equations. Further, as the uniform color space coordinate system, (L*, a*, b*) system can be used.

When the (L*, a*, b*) system is used as the uniform color space coordinate system, color correction simultaneous equations represented by the equations 2 shown hereinafter can be used as the color correction simultaneous equations.

The present invention further relates to a method for deciding dyeing parameters for dyeing lenses comprising the following steps (1) to (8):

(1) obtaining a point of target colored lens ($L^*_T$, $a^*_T$, $b^*_T$) in a uniform color space coordinate system, (2) immersing a lens to be dyed in a dye bath for test dyeing composed of a mixed system of three colors, wherein concentrations of dyes for the three colors are $C_1$, $C_2$ and $C_3$, for a predetermined time (t) and determining a point of a resulting lens ($L^*_0$, $a^*_0$, $b^*_0$) in the uniform color space coordinate system, (3) immersing a lens to be dyed in each of three kinds of dye baths which have a dye concentration for one of the three colors different from that of the dye bath for test dyeing, i.e., which have dye concentrations of ($C_1+\alpha_1$, $C_2$, $C_3$), ($C_1$, $C_2+\alpha_2$, $C_3$) and ($C_1$, $C_2$, $C_3+\alpha_3$), for the predetermined time (t) and determining points of resulting three lenses ($L^*_1$, $a^*_1$, $b^*_1$), ($L^*_2$, $a^*_2$, $b^*_2$) and ($L^*_3$, $a^*_3$, $b^*_3$) in the uniform color space coordinate system, (4) immersing a lens to be dyed in the dye bath for test dyeing for a predetermined time (t+β) and determining a point of resulting lens (L*t, a*t, b*t) in the uniform color space coordinate system, (5) approximately calculating correction factors in color correction simultaneous equations concerning the uniform color space coordinate system including correction factors and time terms from the concentration and time conditions and the obtained points in the uniform color space coordinate system in the steps (3) and (4), (6) calculating differences (ΔL*, Δa*, Δb*) between the point ($L^*_T$, $a^*_T$, $b^*_T$) obtained in the step (1) and the point ($L^*_0$, $a^*_0$, $b^*_0$) obtained in the step (2), (7) calculating deviations ($\Delta C_1$, $\Delta C_2$, $\Delta C_3$, Δt) from the test dyeing conditions ($C_1$, $C_2$, $C_3$, t) from the correction factors obtained in the step (5) and the differences obtained in the step (6) (ΔL*, Δa*, Δb*) using the color correction simultaneous equations, and (8) employing ($C_1+\Delta C_1$, $C_2+\Delta C_2$, $C_3+\Delta C_3$, t+Δt) as new dyeing parameters.

The color correction simultaneous equations used in the above step (5) are represented by the following equations 2. These color correction simultaneous equations are novel ones in view of the fact that they include the correction factors which represent variation of color as a function of dyeing time under constant dye concentrations.

$$\Delta C_1 + \Delta C_2 + \Delta C_3 = 0 \qquad (2)$$

$$\left(\frac{\partial L^*}{\partial C_1}\right)\Delta C_1 + \left(\frac{\partial L^*}{\partial C_2}\right)\Delta C_2 + \left(\frac{\partial L^*}{\partial C_3}\right)\Delta C_3 + \left(\frac{\partial L^*}{\partial t}\right)\Delta t = \Delta L^*$$

-continued $$\left(\frac{\partial a^*}{\partial C_1}\right)\Delta C_1 + \left(\frac{\partial a^*}{\partial C_2}\right)\Delta C_2 + \left(\frac{\partial a^*}{\partial C_3}\right)\Delta C_3 + \left(\frac{\partial a^*}{\partial t}\right)\Delta t = \Delta a^*$$

$$\left(\frac{\partial b^*}{\partial C_1}\right)\Delta C_1 + \left(\frac{\partial b^*}{\partial C_2}\right)\Delta C_2 + \left(\frac{\partial b^*}{\partial C_3}\right)\Delta C_3 + \left(\frac{\partial b^*}{\partial t}\right)\Delta t = \Delta b^*$$

In these equations, $C_1$, $C_2$ and $C_3$ represent dye concentrations in the dye formulation of the target color, $\Delta C_1$, $\Delta C_2$ and $\Delta C_3$ each represent correction to be required for each of the dye concentrations, t represents dyeing time, Δt represents correction to be required for the dyeing time, and L*, a* and b* represent a uniform color space coordinate system, CIELAB color space coordinate system (1976).

In the present invention, it was found that, within the fine adjustment of dye concentrations for dyeing lenses (usually within a color difference of 3 units or less in CIELAB unit), second order or lower terms in Taylor's series of the correction factors including time terms in the equation 2, i.e., three terms of ∂L*/∂t, ∂a*/∂t and ∂b*/∂t, are sufficiently small with respect to the dye concentrations like the other correction factors and they can be ignored. It was experimentally confirmed that, because of this, the equations 2 are accurately and stably satisfied.

The dyeing of lenses may be affected by various factors (in particular, differences of lens production lot and dye production lot). However, these error factors may be due mainly to differences of absolute values in the uniform color space coordinate system. Because the correction factors in the equations 2 offset the differences of absolute values caused by the errors, the correction factors are not changed within the range of fine adjustment for the target color despite the errors and hence stable dyeing result can be obtained.

The conventional color correction equations represented by the equations 1 are usually used in an intermediate step in the calculation of the CCM and therefore the color coordinate system may be an arbitrary one such as three stimulus values (X, Y, Z). However, the color correction in the test dyeing utilizing the equations 2 is performed based on color difference representing difference from the target color. Therefore, the correction factors are important as judging criteria.

As the color coordinate system, the uniform color space coordinate system (L*, u*, v*) or the improved uniform color space coordinate systems thereof such as metric brightness, metric chroma saturation and metric color tone angle of CMC color difference system can be used instead of the above uniform color space coordinate system (L*, a*, b*).

The above method of the present invention is characterized in that the correction factors are experimentally determined by dyeing in a color close to a sample color as a trial and determining dyeing parameters (dye concentrations and dyeing time). This method is particularly effective, for example, for the cases where good accuracy of rough matching cannot be obtained by the CCM.

The steps will be explained more specifically hereinafter.

① Color of target colored lens is determined by a spectrophotometer to obtain its values in the uniform color space coordinate system, $L^*_T$, $a^*_T$ and $b^*_T$.

② Dyeing parameters for a sample color are represented as ($C_1$, $C_2$, $C_3$, t).

A lens is dyed with these parameters and L*, a* and b* are measured by a spectrophotometer. The obtained values are represented as $L^*_0$, $a^*_0$ and $b^*_0$.

When the differences between $L^*_T$, $a^*_T$ and $b^*_T$ and $L^*_0$, $a^*_0$ and $b^*_0$ are within a defined range (0.3 or less of CIELAB color difference), the dyeing parameters can be adopted as the target parameters.

When the differences between $L^*_T$, $a^*_T$ and $b^*_T$ and $L^*_0$, $a^*_0$ and $b^*_0$ are out of the defined range, one proceeds to the following step ③.

③ Dye baths having each of the following three compositions are prepared and dyeing is performed therein for time t.

$(C_1+\alpha_1, C_2, C_3)$
$(C_1, C_2+\alpha_2, C_3)$
$(C_1, C_2, C_3+\alpha_3)$ In the above, $\alpha_1$, $\alpha_2$ and $\alpha_3$ means that the dye concentrations $C_1$, $C_2$ and $C_3$ are increased or decreased by a certain amount of $\alpha_1$, $\alpha_2$ and $\alpha_3$, respectively.

④ Color of the lenses dyed in the three kinds of dye bath of the above ③ is measured by a spectrophotometer and their values in the uniform color space coordinate system:

$L^*_1, a^*_1, b^*_1$
$L^*_2, a^*_2, b^*_2$
$L^*_3, a^*_3, b^*_3$ are determined.

⑤ A dye bath having a dye composition of $(C_1, C_2, C_3)$ is prepared and a lens is dyed in this bath for a time t plus a certain additional time $\beta$ $(t+\beta)$. Color of the resulting dyed lens was measured by a spectrophotometer and represented as $L^*t$, $a^*t$ and $b^*t$. This step constitutes the essential characteristic of the present invention.

⑥ Approximate correction factors are calculated from the colorimetric values measured in the steps ② and ③. More specifically, as regards $L^*$, for example, they are calculated as follows:

$$\frac{\partial L^*}{\partial C_1} \approx \frac{L^*_1 - L^*_0}{\alpha_1}$$

$$\frac{\partial L^*}{\partial C_2} \approx \frac{L^*_2 - L^*_0}{\alpha_2}$$

$$\frac{\partial L^*}{\partial C_3} \approx \frac{L^*_3 - L^*_0}{\alpha_3}$$

$$\frac{\partial L^*}{\partial t} \approx \frac{L^*_t - L^*_0}{\beta}.$$

As also regards $a^*$ and $b^*$, correction factors are calculated similarly to obtain the following correction factors.

$$\left(\frac{\partial L^*}{\partial C_1}\right), \left(\frac{\partial L^*}{\partial C_2}\right), \left(\frac{\partial L^*}{\partial C_3}\right), \left(\frac{\partial L^*}{\partial t}\right)$$

$$\left(\frac{\partial a^*}{\partial C_1}\right), \left(\frac{\partial a^*}{\partial C_2}\right), \left(\frac{\partial a^*}{\partial C_3}\right), \left(\frac{\partial a^*}{\partial t}\right)$$

$$\left(\frac{\partial b^*}{\partial C_1}\right), \left(\frac{\partial b^*}{\partial C_2}\right), \left(\frac{\partial b^*}{\partial C_3}\right), \left(\frac{\partial b^*}{\partial t}\right)$$

⑦ Further, differences $\Delta L^*$, $\Delta a^*$ and $\Delta b^*$ are calculated from the colorimetric values $L^*_0$, $a^*_0$ and $b^*_0$ obtained in the step ② and the colorimetric values obtained in the step ① as follows.

$\Delta L^* = L^*_0 - L^*_T$
$\Delta a^* = a^*_0 - a^*_T$
$\Delta b^* = b^*_0 - b^*_T$ ⑧ $\Delta C_1$, $\Delta C_2$, $\Delta C_3$ and $\Delta t$ are calculated by assigning the correction factors and the differences obtained in the steps ⑥ and ⑦ into the equations 1.

⑨ New parameters for another test dyeing are calculated from $C_1$, $C_2$, $C_3$ and t used in the step ① and $\Delta C_1$, $\Delta C_2$, $\Delta C_3$ and $\Delta t$ obtained in the step ⑧ as follows.

$C_1 + \Delta C_1 \to C_1$
$C_2 + \Delta C_2 \to C_2$
$C_3 + \Delta C_3 \to C_3$
$t + \Delta t \to t$ The step ② is repeated by using the terms at the right of the arrows $(C_1, C_2, C_3, t)$ as new parameters. In the step ②, when the differences between $L^*_T$, $a^*_T$ and $b^*_T$ and $L^*_0$, $a^*_0$ and $b^*_0$ are within a defined range (0.3 or less of CIELAB color difference), the dyeing parameters can be adopted as the target parameters.

When the differences are out of the defined range, the steps ③ to ⑨ are further repeated to asymptotically obtain the target $C_1$, $C_2$, $C_3$ and t.

According to the method of the present invention, the target dyeing parameters can be obtained by performing the test dyeing once to several times. The target colored lens can be obtained by dyeing with these target parameters without fine adjustment.

In the above method, three colors of $C_1$, $C_2$ and $C_3$ are used as the colors of dye bath. These colors are suitably red, blue and yellow since they are primary colors. However, the colors are not limited to them and they may be, for example, any three kinds of colors each obtained by mixed dyes of three primary colors and showing distinct hues.

The dye constituting each color comprises at least one kind of dye. Accordingly, two or more dyes can be used together for one color. In such a case, the dye concentration C is the total concentration of the dyes used together.

The present invention further relates to a method for producing colored lenses utilizing dyeing parameters obtained by the method explained above.

Kind and concentration of dyes, dyeing time, dyeing temperature, color range of colored lenses, material and shape of lenses and the like are not particularly limited at all. Those items will be explained hereinafter, but they are mentioned only for illustrative purpose.

The kind of dyes is not particularly limited. For example, disperse dyes, cationic dyes and the like can be used.

The dye concentrations may be, for example, in a range of 0.01 to 10 g/liter for each dye.

The dyeing time can be, for example, in a range of from 1 second to 3 hours.

The dyeing temperature can be, for example, in a range of 20 to 100° C.

The color range of colored lenses can include all possible points $(L^*, a^*, b^*)$ in the uniform color space coordinate system.

The lens can be a plastic lens. The material for the lens may be, for example, a copolymer derived from methyl methacrylate and one or more kinds of other monomers, diethylene glycol bisallylcarbonate homopolymer, sulfur-containing copolymer, copolymer derived from diethylene glycol bisallylcarbonate and one or more kinds of other monomers, acrylonitrile/styrene copolymer, polystyrene, halogen-containing copolymer, polyvinyl chloride, unsaturated polyester resin, polyethylene terephthalate, polyurethane and the like. As acrylic polymer plastic lenses, lenses of diethylene glycol bisallyl carbonate/benzyl methacrylate/diallyl phthalate terpolymer or diethylene glycol bisallylcarbonate/benzyl methacrylate/diallyl phthalate/alkyl methacrylate quarternary polymer can be mentioned. Examples of those acrylic copolymers are disclosed in Japanese Patent Unexamined Publication Nos. Sho 51-125487, Sho 54-41965, Sho 59-191708 and WO89/09418.

The method of the present invention can be applied not only to dyeing of the lens material itself but also to dyeing of cured coating provided on the lens material or dyeing of such a coating and the lens material, or dyeing of the lens material through such a coating.

While the material of such a coating is not particularly limited, cured polysiloxane coatings composed mainly of organic silicon compounds can be mentioned as typical examples of dyeable or dye-permeable coatings. To these cured polysiloxane coatings, microparticulate inorganic compounds or metal alkoxides, curing agents, organic solvents, surfactants, UV absorbers and the like may be added. Also, the lenses may have a hard coat layer or antireflection coating.

The present invention will be further explained in more detail with reference to the following examples.

EXAMPLE 1

Colorimetric values ($L^*_T$, $a^*_T$, $b^*_T$) of target color, Eye Veil Color Tender Braun 25 (HOYA standard color), were (91.63, 2.22, 3.36).

1.02 g of disperse dye Dianix Blue FBTN (Mitsubishi Chemical) for $C_1$ of sample color parameters ($C_1$, $C_2$, $C_3$, t), 2.28 g of Dianix Red AC-E (Mitsubishi Chemical) for $C_2$ and each 0.85 g, i.e., total 1.70 g of Diacelliton Fast Yellow GL (Mitsubishi Chemical) and Miketon Polyester Yellow MQ (Mitsui Toatsu Chemicals) for $C_3$ were dispersed in 4 liters of water added with 2 ml of dispersing aid by stirring sufficiently to prepare Dye bath-0. Dye bath-1, Dye bath-2 and Dye bath-3 were prepared by increasing one of the concentrations of $C_1$, $C_2$ and $C_3$ by 10%.

TABLE 1

|  | Dianix Blue FBTN | Dianix Red AC-E | Diacelliton Fast Yellow and Miketon Polyester Yellow |
|---|---|---|---|
| Dye bath-0 | 1.02 | 2.28 | 1.7 |
| Dye bath-1 | 1.12 | 2.28 | 1.7 |
| Dye bath-2 | 1.02 | 2.41 | 1.7 |
| Dye bath-3 | 1.02 | 2.28 | 1.87 |

The above four dye baths were warmed to 80° C. and plastic lenses obtained through thermal polymerization of diethylene glycol bisallylcarbonate were dyed in the baths for 3 minutes of dyeing time.

Measured colorimetric values of the lenses are shown in the following Table 2.

TABLE 2

|  | L* | a* | b* |
|---|---|---|---|
| Dye bath-0 | 92.99 | 1.62 | 3.03 |
| Dye bath-1 | 92.15 | 1.42 | 2.92 |
| Dye bath-2 | 92.20 | 1.56 | 3.16 |
| Dye bath-3 | 92.10 | 1.30 | 3.82 |

Another dyeing was performed in the above Dye bath-0 for 4 minutes of dyeing time, which was prolonged by 1 minute compared to the previous dyeing. Measured colorimetric values are shown in the following Table 3.

TABLE 3

|  | L* | a* | b* |
|---|---|---|---|
| Lens dyed in Dye bath-0 for a dyeing time prolonged by 1 minute | 85.46 | 1.78 | 3.21 |

Correction factors are calculated from the above values. There should be 16 correction factors in total, but the coefficients that are obviously 1 or 0 are omitted and 12 correction factors are shown in Table 4.

In the table, for example, the value of $\partial L^*/\partial C_1$ is $-8.235$ indicated in the field at the crossing of the row of $\partial C_1$ and the column of $\partial L^*$.

TABLE 4

|  | $\partial L^*$ | $\partial a^*$ | $\partial b^*$ |
|---|---|---|---|
| $\partial C_1$ | −8.235 | −1.078 | −1.961 |
| $\partial C_2$ | −3.465 | 0.614 | 0.570 |
| $\partial C_3$ | −5.235 | −1.882 | 4.647 |
| $\partial t$ | −5.530 | 0.160 | 0.180 |

Deviations $\Delta L^*$, $\Delta a^*$ and $\Delta b^*$ of the colorimetric values obtained for Dye bath-0 from the sample color are calculated as 1.36, −0.60 and −0.33.

The above 16 correction factors including those of 0 and 1 and the differences $\Delta L^*$, $\Delta a^*$ and $\Delta b^*$ are assigned into the above equations 1 to calculate $\Delta C_1$, $\Delta C_2$, $\Delta C_3$ and $\Delta t$, and the values obtained by adding them to $C_1$, $C_2$, $C_3$ and t respectively are shown in Table 5.

TABLE 5

|  | $C_1 + \Delta C_1$ | $C_2 + \Delta C_2$ | $C_3 + \Delta C_3$ | $t + \Delta t$ |
|---|---|---|---|---|
| Dyeing parameters for subsequent dyeing | 0.83 | 2.49 | 1.68 | 3 minutes and 25 seconds |

When a lens dyed with these dyeing parameters ($C_1+\Delta C_1$, $C_2+\Delta C_2$, $C_3+\Delta C_3$, $t+\Delta t$) (sample lens) was compared to a lens of target color through visual observation, no color difference could be recognized. Further, the color was measured by a spectrophotometer and it was found that the CIELAB color difference was 0.21, which was in the range of negligible color difference (trace).

EXAMPLE 2

The operation in Example 1 was performed by using a system comprising a personal computer shown in FIG. 1.

FIG. 1 shows a system capable of performing numerical operation for obtaining the dyeing parameters shown in Table 5 from the values measured in the colorimetry of one target color lens and five sample lenses under the same condition.

The system comprises a spectrophotometer 1 for measuring colors of one target color lens and five sample lenses. A personal computer 2 contains a L*, a*, b* calculation program 3 whose operation method defined by CIE uses the colorimetric values measured by the spectrophotometer 1 and a dyeing formulation operation program 4 according to the present invention. The system also comprises a display or printer 5 for outputting the operation results.

As explained above, dyeing parameters have conventionally been decided by skilled persons by dyeing a lens in a color whose concentration cannot be distinguished from a target color and correcting color difference with color correction equations or the like. In contrast, the method of the present invention could provide the desired dyeing parameters even when the difference of concentration was as much as 1.36 for L* as in the above examples.

What is claimed is:

1. A method for determining dyeing parameters of color concentration and dyeing time appropriate to dye a lens to a target color in a dye bath comprising three colors, comprising the steps of:
    (a) selecting a target color defined by the three dimensional coordinates of a color space coordinate system;
    (b) dyeing a sample lens in a dye bath having predetermined concentrations of colors $C_1$, $C_2$, and $C_3$ for a predetermined time t,
    (c) determining the three color coordinates for the sample lens,
    (d) repeating steps (b) and (c) a plurality of times, varying each of the concentrations of colors $C_1$, $C_2$, $C_3$, and time t;
    (e) solving simultaneous color difference equations to determine the parameters $C_1$, $C_2$, $C_3$, and time t appropriate to dye the lens to the target color.

2. A method according to claim 1, wherein the coordinates of the color space coordinate system are the coordinates L*, a* and b* of the CIELAB (1976) color space coordinate system, wherein L* is hue, a* is chroma, and b* is brightness.

3. A method for determining dyeing parameters of color concentration and dyeing time appropriate to dye a lens to a target color in a dye bath comprising three colors, comprising the steps of:
    (a) selecting a target color defined by the three dimensional coordinates of a color space coordinate system;
    (b) dyeing a first lens in a bath having predetermined concentrations of colors $C_1$, $C_2$, and $C_3$ for a predetermined time t;
    (c) determining the three color coordinates for the first lens,
    (d) dyeing second, third and fourth lenses in baths having concentrations ($C_1+\alpha_1$, $C_2$, $C_3$), wherein, $\alpha_1$ is the change in concentration $C_1$, ($C_1$, $C_2+\alpha_2$, $C_3$) wherein $\alpha_2$ is the chance in concentration $C_2$, and ($C_1$, $C_2$, $C_3+\alpha_3$), wherein $\alpha_3$ is the change in concentration $C_3$, respectively, for the predetermined time t;
    (e) determining the color coordinates for the second, third and fourth lenses, respectively;
    (f) dyeing a fifth lens in a bath having predetermined concentrations of colors $C_1$, $C_2$, and $C_3$ for a time (t+β), wherein β is a change in time t;
    (g) determining color coordinates for the fifth lens,
    (h) determining correction factors, that is the differentials of each of the three coordinates of the color space with respect to $C_1$, $C_2$, $C_3$, and t;
    (i) calculating differences between the coordinates of the target color and the coordinates determined in step (c);
    (j) calculating deviations $\Delta C_1$, $\Delta C_2$, $\Delta C_3$, and $\Delta t$ from the predetermined values $C_1$, $C_2$, $C_3$, and t by solving color correction simultaneous equations using the correction factors determined in step (h) and differences determined in step (i), wherein $\Delta C_2$) $\Delta C_{2, \Delta C3}$ and $\Delta t$ are the changes of concentration and time, respectively, required to dye a lens to the target color; and
    (k) determining dyeing parameters ($C_1+\Delta C_1$), ($C_2+\Delta C_2$), ($C_3+\Delta C_3$), and (t+$\Delta$t) appropriate to dye a lens to the target color.

4. A method according to claim 3, wherein the coordinates of the space coordinate system are the coordinates $L^*_T$, $a^*_T$ and $b^*_T$ of the CIELAB (1976), wherein $L^*_T$, $a^*_T$ and $b^*_T$ are the values of hue, chroma, and brightness of the target color, color space coordinate system, and wherein the correction factors of step (h) include $\partial L^*/\partial C_1$, $\partial L^*/\partial C_2$, $\partial L^*/\partial C_3$, $\partial L^*/\partial t$, $\partial a^*/\partial C_1$, $\partial a^*/\partial C_2$, $\partial a^*/\partial C_3$, $\partial a^*/\partial t$, $\partial b^*/\partial C_1$, $\partial b^*/\partial C_2$, $\partial b^*/\partial C_3$, and $\partial a^*/\partial t$.

5. A method according to claim 3, wherein said color correction simultaneous equations include the following equations (2):

$$\Delta C_1 + \Delta C_2 + \Delta C_3 = 0 \tag{2}$$

$$\left(\frac{\partial x}{\partial C_1}\right)\Delta C_1 + \left(\frac{\partial x}{\partial C_2}\right)\Delta C_2 + \left(\frac{\partial x}{\partial C_3}\right)\Delta C_3 + \left(\frac{\partial x}{\partial t}\right)\Delta t = \Delta x$$

$$\left(\frac{\partial y}{\partial C_1}\right)\Delta C_1 + \left(\frac{\partial y}{\partial C_2}\right)\Delta C_2 + \left(\frac{\partial y}{\partial C_3}\right)\Delta C_3 + \left(\frac{\partial y}{\partial t}\right)\Delta t = \Delta y$$

$$\left(\frac{\partial z}{\partial C_1}\right)\Delta C_1 + \left(\frac{\partial z}{\partial C_2}\right)\Delta C_2 + \left(\frac{\partial z}{\partial C_3}\right)\Delta C_3 + \left(\frac{\partial z}{\partial t}\right)\Delta t = \Delta z$$

where x, y and z represent the three coordinates of a color space system.

6. A method according to claim 4, wherein said color correction simultaneous equations include the following equations (2):

$$\Delta C_1 + \Delta C_2 + \Delta C_3 = 0 \tag{2}$$

$$\left(\frac{\partial L^*}{\partial C_1}\right)\Delta C_1 + \left(\frac{\partial L^*}{\partial C_2}\right)\Delta C_2 + \left(\frac{\partial L^*}{\partial C_3}\right)\Delta C_3 + \left(\frac{\partial L^*}{\partial t}\right)\Delta t = \Delta L^*$$

$$\left(\frac{\partial a^*}{\partial C_1}\right)\Delta C_1 + \left(\frac{\partial a^*}{\partial C_2}\right)\Delta C_2 + \left(\frac{\partial a^*}{\partial C_3}\right)\Delta C_3 + \left(\frac{\partial a^*}{\partial t}\right)\Delta t = \Delta a^*$$

$$\left(\frac{\partial b^*}{\partial C_1}\right)\Delta C_1 + \left(\frac{\partial b^*}{\partial C_2}\right)\Delta C_2 + \left(\frac{\partial b^*}{\partial C_3}\right)\Delta C_3 + \left(\frac{\partial b^*}{\partial t}\right)\Delta t = \Delta b^*$$

7. A method according to claim 3, wherein steps (b) through (k) are repeated until a difference between the three dimensional color coordinates of a lens dyed using the dyeing parameters ($C_1+\Delta C_1$), ($C_2+\Delta C_2$), ($C_3+\Delta C_3$), and (t+$\Delta$t), and the color coordinates of the target color are 0.3 or less.

8. A method according to claim 4, wherein steps (b) through (k) are repeated until a difference between color coordinates $L^*_x$, $a^*_x$ and $b^*_x$ of a lens dyed using the dyeing parameters $(C_1+\Delta C_1)$, $(C_2+\Delta C_2)$, $(C_3+\Delta C_3)$, and $(t+\Delta t)$, and color coordinates $L^*_T$, $a^*_T$ and $b^*_T$ of the target color are 0.3 or less, wherein $L^*_x$, $a^*_x$ and $b^*_x$ are the hue, chroma, and brightness, respectively, of a lens x.

9. A method according to claim 1, wherein the three colors are red, blue and yellow.

10. A method according to claim 2, wherein the three colors are red, blue and yellow.

11. A method according to claim 3, wherein the three colors are red, blue and yellow.

12. A method according to claim 4, wherein the three colors are red, blue and yellow.

13. A method according to claim 5, wherein the three colors are red, blue and yellow.

14. A method according to claim 6, wherein the three colors are red, blue and yellow.

15. A method according to claim 7, wherein the three colors are red, blue and yellow.

16. A method according to claim 8, wherein the three colors are red, blue and yellow.

17. A method according to claim 1, wherein each color comprises at least one dye.

18. A method according to claim 2, wherein each color comprises at least one dye.

19. A method according to claim 3, wherein each color comprises at least one dye.

20. A method according to claim 4, wherein each color comprises at least one dye.

21. A method according to claim 5, wherein each color comprises at least one dye.

22. A method according to claim 6, wherein each color comprises at least one dye.

23. A method according to claim 7, wherein each color comprises at least one dye.

24. A method according to claim 8, wherein each color comprises at least one dye.

25. A method for dyeing a lens comprising selecting a target color, determining parameters of color concentration and dyeing time appropriate to dye the lens to the target color in a dye bath comprising three colors by the method according to claim 3, and dyeing the lens in the bath using parameters $(C_1+\Delta C_1)$, $(C_2+\Delta C_2)$, $(C_3+\Delta C_3)$, and $(t+\Delta t)$.

26. A method for dyeing a lens comprising selecting a target color $L^*_T$, $a^*_T$ and $b^*_T$, determining parameters of color concentration and dyeing time a appropriate to dye the lens to the target color in a dye bath comprising three colors by the method according to claim 4, and dyeing the lens in the bath using parameters $(C_1+\Delta C_1)$, $(C_2+\Delta C_2)$, $(C_3+\Delta C_3)$, and $(t+\Delta t)$.

27. A method for dyeing a lens comprising selecting a target color, determining parameters of color concentration and dyeing time appropriate to dye the lens to the target color in a dye bath comprising three colors by the method according to claim 5, and dyeing the lens in the bath using parameters $(C_1+\Delta C_1)$, $(C_2+\Delta C_2)$, $(C_3+\Delta C_3)$, and $(t+\Delta t)$.

28. A method for dyeing a lens comprising selecting a target color $L^*_T$, $a^*_T$ and $b^*_T$, determining parameters of color concentration and dyeing time appropriate to dye the lens to the target color in a dye bath comprising three colors by the method according to claim 6, and dyeing the lens in the bath using parameters $(C_1+\Delta C_1)$ $(C_2+\Delta C_2)$, $(C_3+\Delta C_3)$, and $(t+\Delta t)$.

29. A method for dyeing a lens comprising selecting a target color, determining parameters of color concentration and dyeing time appropriate to dye the lens to the target color in a dye bath comprising three colors by the method according to claim 7, and dyeing the lens in the bath using parameters $(C_1+\Delta C_1)$, $(C_2+\Delta C_2)$, $(C_3+\Delta C_3)$, and $(t+\Delta t)$.

30. A method for dyeing a lens comprising selecting a target color $L^*_T$, $a^*_T$ and $b^*_T$, determining parameters of color concentration and dyeing time appropriate to dye the lens to the target color in a dye bath comprising three colors by the method according to claim 8 and dyeing the lens in the bath using parameters $(C_1+\Delta C_1)$, $(C_2+\Delta C_2)$, $(C_3+\Delta C_3)$, and $(t+\Delta t)$.

31. A method according to claim 25, wherein the lens is a plastic lens.

32. A method according to claim 26, wherein the lens is a plastic lens.

33. A method according to claim 27, wherein the lens is a plastic lens.

34. A method according to claim 28, wherein the lens is a plastic lens.

35. A method according to claim 29, wherein the lens is a plastic lens.

36. A method according to claim 30, wherein the lens is a plastic lens.

* * * * *